United States Patent Office 2,736,721
Patented Feb. 28, 1956

2,736,721

ADHESIVES FROM MIXED SILOXANES AND, OPTIONALLY, A TITANIUM ESTER

John F. Dexter, Midland, Mich., assignor to Dow Corning Corporation, Midland, Mich., a corporation of Michigan No Drawing. Application April 1, 1953,
Serial No. 346,277

19 Claims. (Cl. 260—42)

This invention relates to siloxane adhesives.

This application is a continuation-in-part of the applicant's copending application, Serial No. 313,800, filed October 8, 1952, now abandoned.

Organopolysiloxanes have found wide industrial application because of their thermal stability, dielectric properties and resistance to atmospheric deterioration. Because of these properties, organopolysiloxanes are usable under conditions where corresponding organic materials are of no use. It has long been desired to prepare a commercially useful organopolysiloxane adhesive, which would have sufficient cohesive strength that an adhesive film thereof could be stripped from a surface without leaving any appreciable amount of the adhesive behind. Prior to this invention, no organipolysiloxane was known which would meet these requirements.

Certain organopolysiloxane materials have been referred to in the art as pressure-sensitive materials and as adhesives. For example, U. S. Patent 2,460,795 refers to the preparation of pressure-sensitive tapes by coating glass cloth with partially vulcanized organopolysiloxane elastomers. However, the adhesive strengths of these partially vulcanized tapes are not comparable with the adhesive strengths of the materials of this invention.

It is an object of this invention to produce an adhesive material which will adhere to any known surface. Another object of this invention is to produce adhesive tapes which are usable at temperatures ranging from —80° C. to +250° C. Another object is to prepare a superior organopolysiloxane adhesive which has cohesive and adhesive strengths comparable with organic adhesives. Another object of this invention is to prepare adhesives having excellent electrical properties. Another object is to prepare an organopolysiloxane which does not require a high temperature cure in order to produce effective adhesion. Other objects and advantages will be apparent from the following description.

This invention relates to an adhesive comprising a mixture of (a) 5 to 70 per cent by weight of a benzene soluble resin copolymer of $SiO_2$ and $R_3SiO_{1/2}$, where R is an alkyl radical of less than 4 carbon atoms or a phenyl radical, and where the ratio of $R_3SiO_{1/2}$ units to $SiO_2$ units is between 0.6 to 0.9 inclusive, and (b) 95 to 30 per cent by weight of a diorganopolysiloxane having the general formula $R'_2SiO$, where R' is methyl or phenyl and having a viscosity of at least 1,000,000 cs. at 25° C. In each of ingredients (a) and (b), at least 90 per cent of the total number of R and R' radicals respectively are alkyl.

The resin copolymer (a) of this invention can be a two-component copolymer composed essentially of $SiO_2$ and $R_3SiO_{1/2}$ units in the above-defined ratio. Resin (a) may also contain limited amounts of $R_2SiO$ units. In this event, the resin is a three-component copolymer which is composed essentially of $SiO_2$, $R_3SiO_{1/2}$, and $R_2SiO$ units, where R is as above defined. When diorganosiloxane units are present, the ratio of the total amount of $R_3SiO_{1/2}$ units plus $R_2SiO$ units to $SiO_2$ units is from .6 to .9 inclusive.

The diorganosiloxane units may be present in resin (a) in amount up to .2 per $SiO_2$ unit.

A preferred embodiment of this invention consists of a mixture of (a) and (b) which also contains up to 10 per cent by weight of a hydrolyzable titanium compound of the formula $Ti(OR)_4$ or an aliphatic hydrocarbon soluble partial hydrolyzate thereof. In the titanium compounds, R is an aliphatic hydrocarbon radical of less than 20 carbon atoms or a hydroxylated aliphatic hydrocarbon radical of less than 20 carbon atoms. The addition of these titanium esters increases the adhesive strength of the compounds of this invention.

The diorganopolysiloxane polymers (b) which may be employed in the adhesive of this invention are those having viscosities of at least 1,000,000 cs. when measured at 25° C. These polymers may vary from viscous fluids to deformable solids whose viscosity is so high that measurement of the viscosity is meaningless. However, they are uniformly characterized by being soluble in solvents such as benzene, xylene, toluene, and petroleum solvents. These polymers may be dimethylpolysiloxanes or they may be copolymers of dimethylsiloxane with up to 20 mol per cent phenylmethylsiloxane or copolymers of dimethylsiloxane with up to 10 mol per cent diphenylsiloxane. The preferred polymers are the dimethylpolysiloxanes. It is to be understood that the polymer (b) may contain traces of $RSiO_{3/2}$ and/or $R_3SiO_{1/2}$ units.

The polymers (b) employed in this invention are readily prepared by any of the known methods for preparing siloxane high polymers such as acid or alkali catalyzed polymerization of the corresponding cyclic siloxanes.

The R groups in the triorganosiloxanes and the diorganosiloxanes of component (a) are alkyl radicals such as methyl, ethyl and propyl or combinations thereof or combinations of any of these alkyl radicals and phenyl radicals. In any event, the total number of phenyl radicals in the siloxanes should be no more than 10 per cent of the total number of R groups. Specific examples of siloxanes which may be copolymerized with the $SiO_2$ are trimethylsiloxane, dimethylsiloxane, phenyldimethylsiloxane, phenylmethylsiloxane, triethylsiloxane, propyldimethylsiloxane, phenylethylsiloxane, and ethylmethylsiloxane.

The resin copolymers (a) of this invention may be prepared by cohydrolyzing the corresponding hydrolyzable silanes. The cohydrolysis is best carried out in the presence of a water-miscible solvent such as dioxane. In view of the great reactivity of silicon tetrachloride, less gelation occurs when ethylorthosilicate is employed as one of the reactants. For example, a mixture of ethylorthosilicate, trimethylchlorosilane, and dimethyldichlorosilane may be cohydrolyzed by adding the mixture to a solution of water in dioxane.

The preferred method for preparing the resin copolymers (a) is disclosed in the copending application of William H. Daudt et al., Serial Number 184,720, filed September 13, 1950, now U. S. Patent 2,676,182, issued April 20, 1954. In accordance with Daudt et al., the resins of this invention can be prepared by reacting the appropriate organosilane or the appropriate organosiloxane with a silica hydrosol having a pH below 5, there being at least 1 mol of organosilicon compound per mol of $SiO_2$ in the reaction mixture. When diorganosiloxanes are to be included in resin component (a), it is preferred that the diorganosilicon reactant be added to the hydrosol after addition of the triorganosilicon compound has been completed.

Any combination of components (a) and (b) in the ratios stated above gives excellent adhesives. It has been found that the best adhesives comprise mixtures of about equal per cents by weight of components (a) and (b). This is true whether a titanium compound is present or not. For example, the best adhesion is obtained with a composition containing 50 per cent by weight of (a) and 50 per cent by weight of (b); or, for example, by employing a composition comprising 49 per cent by weight of (a), 49 per cent by weight of (b), and 2 per cent by weight of any of the defined titanium compounds.

As stated above, titanium esters of the formula Ti(OR)$_4$ may be employed to improve the adhesives of this invention. Specific examples of titanium compounds which are operative herein are titanium esters of monohydric alcohols such as tetraisopropyl titanate, tetra(2-ethylhexyl) titanate, tetrabutyl titanate, and tetrastearyl titanate; and esters of polyhydric alcohols such as octylene glycolyl titanate and titanates of tetraethylene glycol and glycerine. The titanates of the polyhydric alcohols can be those which contain unreacted hydroxyl groups as well as those in which all of the hydroxyl groups have reacted with the titanium. Partial hydrolyzates of any of the above titanates are operative. The partial hydrolyzates are benzene soluble polyesters which have at least one

linkage in the molecule.

If desired, catalysts may be mixed with the adhesives. The catalysts hasten the cure of the adhesive and improve the moisture resistance thereof. Suitable catalysts include, for example, organometallic compounds such as alkylzirconates, alkylborates; metal alkoxides such as aluminum, magnesium, and calcium alkoxides, and metal salts of carboxylic acids such as zinc octoate, lead-2-ethyl-hexoate and lead naphthenates, and alkoxy silanes such as ethyl silicate. The catalysts are generally employed in amount from .001 to .5 per cent by weight based on the weight of the total adhesive composition. Larger amounts may be employed, if desired. In addition to the above catalyst, the adhesives may contain small amounts of fillers such as ferric oxide, TiO$_2$, and zinc oxide. It has been found that ferric oxide decreases the weight loss of the adhesives when they are heated at temperatures of 250° C. The fillers are generally employed in amount of about 3 per cent by weight of the total composition.

The adhesive compositions of this invention are prepared by merely mixing ingredients (a) and (b) together with, if desired, any of the above additives. It is preferable to mix the ingredients in a mutual solvent. After mixing the solvent may be removed leaving a tacky mass which may be applied by knife or doctor blade to the surfaces to be adhered. In general, however, it is more convenient to apply a solution of the adhesive to the surface. This may be accomplished in any convenient manner such as by dipping the base member in the solution or by brushing or spraying the solution on the surface. Suitable solvents which may be employed are benzene, toluene, and petroleum hydrocarbon solvents.

The amount of adhesive material which is applied to surfaces may be varied to fit particular circumstances. Ordinarily, sufficient adhesive should be applied to render the surface definitely tacky to the touch after the removal of any solvent. After applying it to the surface, the adhesive may be cured by air drying or by heating at temperatures ranging up to 300° C. Heating will hasten removal of the solvent and also tends to increase the cohesive strength of the adhesive film. After curing, the surfaces to be adhered are brought together. No further curing is needed in order to establish a firm bond between them.

The adhesives of this invention will adhere to any known solid surface. Thus, they may be used on such varied surfaces as, for example, those of glass, steel, aluminum, iron, fluorocarbon polymers, urea formaldehyde and melamine formaldehyde polymers, paper, leather, acrylic polymers, polyethers, polyesters, polyamides, polyethylene, and organic and inorganic materials in general. The adhesives of this invention may be employed in the fabrication of cable insulation, transformers and laminates. They are particularly adaptable for adhering commercial polyfluoroethylene polymers to metals, silicone resins and other plastics, such as may be desired in cable construction. The adhesive is useful at temperatures upwards of 300° C.

The adhesives of this invention are particularly adaptable for the preparation of adhesive tapes. Due to the fact that these materials will adhere to any known surface, any flexible material is suitable for use as the tape backing. Specific examples of backing materials which can be employed are inorganic materials such as foils of metals such as aluminum, lead, platinum, gold and tin; glass cloth and glass cloth which has been coated with organosilicon resins and elastomers; and asbestos tapes and organic materials such as cellulose esters such as cellulose acetate, cellulose butyrate, cellulose nitrate, and cellulose propionate; cellulose ethers such as ethyl cellulose, butyl cellulose and benzyl cellulose; vinyl polymers such as polyvinyl-chloride, polyvinyl alcohol and copolymers of vinyl chloride-vinyl acetate and vinyl chloride-vinylidine chloride; polystyrene; polyamides; polyesters such as ethylene-glycol-terephthalates; polyethylene; fluorocarbon polymers such as polytetrafluoroethylene and polychlorotrifluoroethylene; organic elastomers such as natural rubber, GRS, Buna-S, chloroprene, neoprene, butadiene-styrene copolymers, acrylonitrile-butadiene copolymers and mixtures thereof, polysiloxane elastomers; sulfur containing elastomers such as ethylene polysulfides; acrylic polymers such as methylmethacrylate, acrylonitrile and methylacrylate polymers and copolymers thereof; and organic fabrics such as cotton, linen, silk, wool, rayon, and any of the various synthetic organic fabrics.

The tapes of this invention are useful as medicinal tapes for bandaging the human body and also as packaging tapes for sealing bundles. In addition, these tapes may be used for insulating electrical conductors and for the sealing of voids.

The following examples are illustrative only and are not to be construed as limiting the invention which is properly delineated in the appended claims.

EXAMPLE 1

A siloxane resin consisting of SiO$_2$ and (CH$_3$)$_3$Si-units was prepared in the following manner:

252 g. concentrated HCl was in a flask diluted with 144 g. of water. The acid mixture was cooled and 432 g. Na$_2$SiO$_3$ and 720 g. of water were added under continuous stirring. Immediately following the addition of the sodium silicate, 450 g. of isopropanol was added followed by the addition of 222 g. of (CH$_3$)$_3$SiCl and 288 g. hexamethyldisiloxane. Heat was applied and the mixture was brought to reflux for a period of ½ hour and then cooled. 240 g. of xylene was added and the resin-solvent layer was separated from the acid layer. After separation 124 g. of isopropanol was added and the solution was stripped to 130–135° C. with CO$_2$ blowing through the resin solution. The resin solution was adjusted to 77.1 per cent solids in xylene. The (CH$_3$)$_3$Si/SiO$_2$ ratio of the resin was 0.8.

EXAMPLE 2

A non-flowing dimethylsiloxane polymer, said polymer having a viscosity greater than 1,000,000 centistokes, was dissolved in the resin solution of Example 1 and the mixture diluted with Skellysolve D to 35 per cent solids. After admixing, the mixture was applied by paint brush to glass tape having a commercial designation ECC 127 such tape being manufactured and sold by Owens Corning Fiber Glass Corporation. Sufficient solution was painted on these glass tapes to give a film averaging 1 mil in thickness after removal of solvent. The glass tapes so coated were tested fully in accordance with ASTM D 1000 48 T (entitled "Testing Pressure Sensitive Adhesive Tapes Used in Electrical Insulation") except that a graduated spring balance was employed to measure adhesive strength. Tapes were conditioned prior to measuring their adhesive strength either by air drying or by heating at temperatures up to 250° C. whereby the solvent is substantially removed. It has been found that a heat treatment of 5 minutes at 250° C. brings about substantially equivalnet removal of solvent as air drying for 12 to 24 hours. All mixtures tested in Table I were obtained by dissolving varying amounts of dimethylsiloxane polymer in the resin solution of Example 1 and diluting the dissolved mixture with Skellysolve D to 35 per cent total solids. Skellysolve D is a petroleum hydrocarbon solvent manufactured and sold by Skelly Oil Company.

*Table I*

| Percent Resin | Percent Dimethylsiloxane Polymer | Conditioning | Adhesive Strength in Grams, ASTM 1000 48 T |
| --- | --- | --- | --- |
| 10 | 90 | 5 min/250° C | 153 |
| 30 | 70 | 5 min/250° C | 171 |
| 50 | 50 | 5 min/250° C | 475 |
| 50 | 50 | 16 hrs. in air | 325 |
| 66.7 | 33.3 | 16 hrs. in air | 240 |
| 75 | 25 | 5 min/250° C | 0 |
| 80 | 20 | 5 min/250° C | 0 |

EXAMPLE 3

When an adhesive comprising 50 per cent of the resin of Example 1 and 50 per cent of a polysiloxane copolymer of 5 mol per cent phenylmethylsiloxane and 95 mol per cent dimethylsiloxane, such polymer having a viscosity of 1,000,000 cs., is tested in accordance with Example 2, adhesive strengths in excess of 130 g. are obtained.

EXAMPLE 4

Results equivalent to those obtained in Example 2 are obtained employing an adhesive consisting of 50 per cent by weight of a solid benzene soluble dimethylsiloxane having a viscosity greatly in excess of 1,000,000 centistokes and 50 per cent by weight of a copoymer having an $R_3Si/SiO_2$ ratio of .6. In the resin copolymer 5 per cent of the total number of R radicals were phenyl, the balance of the R radicals were ethyl.

EXAMPLE 5

Adhesive mixtures were prepared employing 49 per cent by weight of resin of Example 1, 49 per cent by weight of a nonflowing dimethylsiloxane polymer having a viscosity greater than 1,000,000 cs. and 2 per cent by weight of the titanium compounds listed in Table II. A mixture (run 1) which consists of 50 per cent by weight of the resin of Example 1, and 50 per cent of the nonflow dimethylsiloxane polymer is included as a means of comparison. The adhesive mixtures dissolved in xylene were applied to silicone resin sized glass tape and tested in the same manner as described in Example 2 with the results as shown in Table II.

*Table II*

| Run | Titanium Compound | Percent Pick up | Conditioning, min/250° C. | Adhesive Strength in Grams, ASTM 1000 48 T |
| --- | --- | --- | --- | --- |
| 1 | None | 30 | 5 | 1,090 |
|   | do | 50 | 5 | 2,040 |
| 2 | Tetra butyl titanate | 30 | 5 | 1,670 |
|   | do | 50 | 5 | 2,760 |
| 3 | Tetra isopropyl titanate | 29 | 5 | 1,470 |
|   | do | 45 | 5 | 2,260 |
| 4 | Tetra stearyl titanate | 18 | 5 | 1,140 |
|   | do | 38 | 5 | 1,850 |
| 5 | Octyl glycolyl titanate | 28 | 5 | 1,530 |
| 6 | Tetra 2-ethyl hexyl titanate | 44 | 5 | 1,110 |

In Table II, percent pickup refers to the amount of adhesive applied to the glass tape based on the weight of the tape.

EXAMPLE 6

An adhesive was prepared in accordance with the method of Example 2, employing the silicone resin composition of Example 1 and a non-flowing benzene-soluble dimethylpolysiloxane. This solution was divided into several portions and to each portion was added the catalyst in the amount shown in Table III below. Each portion was then applied by brushing to a 1" x 8" piece of glass cloth which was impregnated with a cured methylphenylpolysiloxane resin. Each cloth sample was heated as indicated in the table and weighed to determine the amount of adhesive pick-up. The adhesive strength after each cure was determined in accordance with the aforementioned ASTM 1000 48 T.

*Table III*

| Catalyst | Percent by weight catalyst based on total wt. of adhesive | Adhesive pick-up in grams | Adhesive strength in g. per inch of width | |
| --- | --- | --- | --- | --- |
|   |   |   | After 5 min. at 150°C. | After 5 min. at 250°C. |
| Tertiary butyl zirconate | .47 | .18 | 370 | 830 |
|   | .47 | .32 | 900 | 1,230 |
| Lead octoate | .1 | .12 | 740 | 600 |
|   | .1 | .32 | 1,030 | 1,230 |
| Tributylborate | .07 | .16 | 820 | 800 |
| Aluminum isopropoxide | .002 | .15 | 400 | 740 |

EXAMPLE 7

A solution of the resin copolymer of Example 1 was mixed by the method of Example 2 with a benzene-soluble, non-flowing dimethylpolysiloxane in amount so that there was 50 per cent by weight of each ingredient. This solution was applied by brushing to films of the materials shown in Table IV. Each film was 1" wide and 8" long. Each coated film was then cured as indicated in the table. After curing, the gain in weight of each film was determined to ascertain the amount of adhesive pick-up. The adhesive strength of each sample was measured in accordance with the aforesaid ASTM test.

*Table IV*

| Backing | Cure | Adhesive pick-up in grams | Adhesive strength in grams per inch of width |
| --- | --- | --- | --- |
| High temperature cellophane | 5 min. at 250°C | .32 | 910 |
| Aluminum foil | 5 min. at 250°C | .3 | 1,580 |
| Do | 5 min. at 250°C | .76 | 2,200 |
| Silicone varnished glass cloth.[1] | 5 min. at 250°C | .6 | 550 |
| Ethylene glycol-terephthalate polyester | 5 min. at 150°C | .35 | 1,240 |
| Polyethylene | 5 min. at 70°C | .13 | 390 |
| Polytetrafluoroethylene | 5 min. at 70°C | .07 | 400 |

[1] The silicone varnish was a cured methylphenylpolysiloxane resin.

Paper was coated with the composition of this example and the resulting tape adhered satisfactorily to surfaces and the tape remained flexible at −55° C.

EXAMPLE 8

A resinous copolymer (a) was prepared as follows:

100 ml. of a sodium silicate solution containing 26.7 per cent by weight $SiO_2$, 8.2 per cent by weight $Na_2O$ and having a specific gravity of 1.36 at 25° C. and a density of 33.35° Bé., was diluted with 200 ml. of water and the resulting solution was mixed with 100 ml. of 38 per cent hydrochloric acid, 125 ml. of isopropanol and 200 ml. of hexamethyldisiloxane. The mixture was stirred until the emulsion which had formed began to break. 45 g. of dimethyldichlorosilane in 45 g. of toluene was then added rapidly and stirring was continued for ½ hour whereupon the upper layer was separated, filtered, and the solvent was removed therefrom to give a non-tacky resinous material. This material was found upon analysis to contain .57($CH_3$)$_3$Si— units per $SiO_2$ unit and .13($CH_3$)$_2$Si= units per $SiO_2$ unit. This gives a total of .70 organosilyl units per $SiO_2$ unit.

An adhesive containing 50 per cent by weight of this resin and 50 per cent by weight of a solid benzene soluble dimethylpolysiloxane was prepared in accordance with the procedure of Example 2. The resulting solution was brushed on a 1" x 8" piece of varnished glass cloth. (The varnish was composed of a cured methylphenylpolysiloxane resin.) The sample was then cured for 5 minutes at 250° C. The adhesive pick-up was .5 g. This sample had an adhesive strength of 860 g. per inch of width as determined by the aforesaid ASTM test.

That which is claimed is:

1. As a composition of matter a mixture comprising (a) 5 to 70 per cent by weight of a benzene soluble resin copolymer composed essentially of structural units of $SiO_2$ and $R_3SiO_{1/2}$ where R is a monovalent hydrocarbon selected from the group consisting of alkyl radicals of less than 4 carbon atoms and phenyl and at least 90 per cent of the total number of R radicals are alkyl and in said copolymer the ratio of $R_3SiO_{1/2}$ units to $SiO_2$ units is between 0.6 to 0.9 inclusive and (b) 95 to 30 per cent by weight of a benzene soluble organosiloxane of at least 1,000,000 centistokes viscosity at 25° C., said organosiloxane having the general formula $R'_2SiO$ where R' is a monovalent hydrocarbon radical selected from the group consisting of methyl and phenyl and at least 90 per cent of the total number of R' radicals are methyl.

2. The composition of claim 1 wherein (b) is dimethyl siloxane.

3. As a composition of matter a mixture comprising (a) 5 to 70 per cent by weight of a benzene soluble resin copolymer composed essentially of structural units of $SiO_2$ and ($CH_3$)$_3SiO_{1/2}$ and in said copolymer the ratio of ($CH_3$)$_3SiO_{1/2}$ units to $SiO_2$ units is between 0.6 to 0.9 inclusive and (b) 95 to 30 per cent by weight of a benzene soluble organosiloxane of at least 1,000,000 centistokes at 25° C. and said organosiloxane having the general formula $R'_2SiO$ where R' is a monovalent hydrocarbon radical selected from the group consisting of methyl and phenyl and at least 90 percent of the total number of R' radicals are methyl.

4. The composition of claim 3 wherein (b) is dimethyl siloxane.

5. As an article of manufacture an adhesive tape comprising a flexible material having deposited thereon the composition composed essentially of (a) 5 to 70 per cent by weight of a benzene soluble resin copolymer comprising structural units of $SiO_2$ and $R_3SiO_{1/2}$ where R is a monovalent hydrocarbon selected from the group consisting of alkyl radicals of less than 4 carbon atoms and phenyl and at least 90 per cent of the total number of R radicals are alkyl and in said copolymer the ratio of $R_3SiO_{1/2}$ units to $SiO_2$ units is between 0.6 to 0.9 inclusive and (b) 95 to 30 per cent by weight of a benzene soluble organosiloxane of at least 1,000,000 centistokes viscosity at 25° C., said organosiloxane having the general formula $R'_2SiO$ where R' is a monovalent hydrocarbon radical selected from the group consisting of methyl and phenyl and at least 90 per cent of the total number of R' radicals are methyl.

6. As a composition of matter a mixture comprising (a) 5 to 70 per cent by weight of a benzene soluble resin copolymer composed essentially of structural units of $SiO_2$ and $R_3SiO_{1/2}$ where R is a monovalent hydrocarbon selected from the group consisting of alkyl radicals of less than 4 carbon atoms and phenyl and at least 90 per cent of the total number of R radicals are alkyl and in said copolymer the ratio of $R_3SiO_{1/2}$ units to $SiO_2$ units is between 0.6 to 0.9 inclusive and (b) 95 to 30 per cent by weight of a benzene soluble organosiloxane of at least 1,000,000 centistokes viscosity at 25° C., said organosiloxane having the general formula $R'_2SiO$ where R' is a monovalent hydrocarbon radical selected from the group consisting of methyl and phenyl and at least 90 per cent of the total number of R' radicals are methyl, and (c) up to 10 per cent by weight of a titanium compound selected from the group consisting of titanium compounds having the general formula $Ti(OR)_4$ and aliphatic hydrocarbon soluble partial hydrolyzates thereof in which compounds R is selected from the group consisting of aliphatic hydrocarbon radicals of less than 20 carbon atoms and hydroxylated aliphatic radicals of less than 20 carbon atoms.

7. As a composition of matter a mixture comprising (a) 5 to 70 per cent by weight of a benzene soluble resin copolymer composed essentially of structural units of $SiO_2$ and ($CH_3$)$_3SiO_{1/2}$ and in said copolymer the ratio of ($CH_3$)$_3SiO_{1/2}$ units to $SiO_2$ units is between 0.6 to 0.9 inclusive and (b) 95 to 30 per cent by weight of a benzene soluble organosiloxane of at least 1,000,000 centistokes at 25° C. and said organosiloxane having the general formula $R'_2SiO$ where R' is a monovalent hydrocarbon radical selected from the group consisting of methyl and phenyl and at least 90 per cent of the total number of R' radicals are methyl, and (c) up to 10 per cent by weight of a titanium compound selected from the group consisting of titanium compounds having the general formula $Ti(OR)_4$ and aliphatic hydrocarbon soluble partial hydrolyzates thereof in which compounds R is selected from the group consisting of aliphatic hydrocarbon radicals of less than 20 carbon atoms and hydroxylated aliphatic radicals of less than 20 carbon atoms.

8. As an article of manufacture an adhesive tape comprising a flexible material having deposited thereon the composition composed essentially of (a) 5 to 70 per cent by weight of a benzene soluble resin copolymer comprising structural units of $SiO_2$ and $R_3SiO_{1/2}$ where R is a monovalent hydrocarbon selected from the group consisting of alkyl radicals of less than 4 carbon atoms and phenyl and at least 90 per cent of the total number of R radicals are alkyl and in said copolymer the ratio of $R_3SiO_{1/2}$ units to $SiO_2$ units is 0.6 to 0.9 inclusive and (b) 95 to 30 per cent by weight of a benzene soluble organosiloxane of at least 1,000,000 centistokes viscosity at 25° C., said organosiloxane having the general formula $R'_2SiO$ where R' is a monovalent hydrocarbon radical selected from the group consisting of methyl and phenyl and at least 90 per cent of the total number of R' radicals are methyl, and (c) up to 10 per cent by weight of a titanium compound selected from the group consisting of titanium compounds having the general formula $Ti(OR)_4$ and aliphatic hydrocarbon soluble partial hydrolyzates thereof in which compounds R is selected from the group consisting of aliphatic hydrocarbon radicals of less than 20 carbon atoms and hydroxylated aliphatic radicals of less than 20 carbon atoms.

9. A composition of matter comprising (a) 5 to 70 per cent by weight of a benzene soluble copolymer resin composed essentially of structural units of the formulae $SiO_2$, $R_3SiO_{1/2}$ and up to .2$R_2SiO$ units per $SiO_2$ unit, in which resin R is a monovalent hydrocarbon radical of the group consisting of alkyl radicals of less than 4 carbon atoms and phenyl radicals, at least 90 per cent of the total number of R radicals in the copolymer being alkyl, in said copolymer the ratio of the total $R_3SiO_{1/2}+R_2SiO$ units to $SiO_2$ units is from 0.6 to 0.9 inclusive and (b) 95 to 30 per cent by weight of a benzene soluble organosiloxane of at least one million cs. viscosity at 25° C. said organosiloxane having the general formula $R'_2SiO$ where R' is a monovalent hydrocarbon radical of the group consisting of methyl and phenyl radicals, at least 90 per cent of the total number of R' groups in (b) being methyl.

10. An adhesive tape comprising a flexible material having deposited thereon a composition comprising (a) 5 to 70 per cent by weight of a benzene soluble copolymer resin composed essentially of structural units of the formulae $SiO_2$, $R_3SiO_{1/2}$ and up to .2$R_2SiO$ units per $SiO_2$ unit, in which resin R is a monovalent hydrocarbon radical of the group consisting of alkyl radicals of less than 4 carbon atoms and phenyl radicals, at least 90 per cent of the total number of R radicals in the copolymer being alkyl, in said copolymer the ratio of the total $R_3SiO_{1/2}+R_2SiO$ units to $SiO_2$ units is from 0.6 to 0.9 inclusive and (b) 95 to 30 per cent by weight of a benzene soluble organosiloxane of at least one million cs. viscosity at 25° C. said organosiloxane having the general formula $R'_2SiO$ where R' is a monovalent hydrocarbon radical of the group consisting of methyl and phenyl radicals, at least 90 per cent of the total number of R' groups in (b) being methyl.

11. An adhesive tape in accordance with claim 10 wherein the flexible material is an organic polymeric material.

12. An adhesive tape in accordance with claim 10 wherein the flexible material is polyethylene.

13. An adhesive tape in accordance with claim 10 wherein the flexible material is a fluorinated polyethylene.

14. An adhesive tape in accordance with claim 10 wherein the flexible material is glass cloth impregnated with an organopolysiloxane resin.

15. A composition of matter comprising (a) 5 to 70 per cent by weight of a benzene soluble copolymer resin composed essentially of structural units of the formulae $SiO_2$, $R_3SiO_{1/2}$ and up to $.2R_2SiO$ units per $SiO_2$ unit, in which resin R is a monovalent hydrocarbon radical of the group consisting of alkyl radicals of less than 4 carbon atoms and phenyl radicals, at least 90 per cent of the total number of R radicals in the copolymer being alkyl, in said copolymer the ratio of the total $$R_3SiO_{1/2}+R_2SiO$$

units to $SiO_2$ units is from 0.6 to 0.9 inclusive and (b) 95 to 30 per cent by weight of a benzene soluble organosiloxane of at least one million cs. viscosity at 25° C. said organosiloxane having the general formula $R'_2SiO$ where R' is a monovalent hydrocarbon radical of the group consisting of methyl and phenyl radicals, at least 90 per cent of the total number of R' groups in (b) being methyl and (c) up to 10 per cent by weight of a compound of the group consisting of titanium compounds of the formula $Ti(OR)_4$ and aliphatic hydrocarbon soluble partial hydrolyzates thereof, in said compounds R being of the group consisting of aliphatic hydrocarbon radicals of less than 20 carbon atoms and hydroxylated aliphatic hydrocarbon radicals of less than 20 carbon atoms.

16. An adhesive tape comprising a flexible material having deposited thereon a composition comprising (a) 5 to 70 per cent by weight of a benzene soluble copolymer resin composed essentially of structural units of the formulae $SiO_2$, $R_3SiO_{1/2}$ and up to $.2R_2SiO$ units per $SiO_2$ unit, in which resin R is a monovalent hydrocarbon radical of the group consisting of alkyl radicals of less than 4 carbon atoms and phenyl radicals, at least 90 per cent of the total number of R radicals in the copolymer being alkyl, in said copolymer the ratio of the total $R_3SiO_{1/2}+R_2SiO$ uits to $SiO_2$ units is from 0.6 to 0.9 inclusive and (b) 95 to 30 per cent by weight of a benzene soluble organosiloxane of at least one million cs. viscosity at 25° C. said organosiloxane having the general formula $R'_2SiO$ where R' is a monovalent hydrocarbon radical of the group consisting of methyl and phenyl radicals, at least 90 per cent of the total number of R' groups in (b) being methyl and (c) up to 10 per cent by weight of a compound of the group consisting of titanium compounds of the formula $Ti(OR)_4$ and aliphatic hydrocarbon soluble partial hydroylzates thereof, in said compounds R being of the group consisting of aliphatic hydrocarbon radicals of less than 20 carbon atoms and hydroxylated aliphatic hydrocarbon radicals of less than 20 carbon atoms.

17. An adhesive tape in accordance with claim 16 wherein the flexible material is an organic polymeric material.

18. An adhesive tape in accordance with claim 5 wherein the flexible material is an organic polymeric material.

19. An adhesive tape in accordance with claim 8 wherein the flexible material is an organic polymeric material.

References Cited in the file of this patent

UNITED STATES PATENTS

| 2,442,196 | Coggeshall | May 25, 1948 |
| 2,512,058 | Gulledge | June 20, 1950 |
| 2,672,455 | Currie | Mar. 16, 1954 |

FOREIGN PATENTS

| 500,963 | Belgium | Feb. 15, 1951 |